United States Patent
Fujii et al.

(10) Patent No.: US 10,152,289 B2
(45) Date of Patent: Dec. 11, 2018

(54) COMMUNICATION APPARATUS THAT OBTAINS APPLICATION INFORMATION FROM A COMMUNICATION PARTNER APPARATUS EXISTING WITHIN AN EFFECTIVE COMMUNICATION RANGE, CONTROL METHOD THEREFOR, AND STORAGE MEDIUM

(71) Applicant: CANON KABUSHIKI KAISHA, Tokyo (JP)

(72) Inventors: Kenichi Fujii, Kawasaki (JP); Koji Fukunaga, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 14/983,908

(22) Filed: Dec. 30, 2015

(65) Prior Publication Data
US 2016/0216927 A1    Jul. 28, 2016

(30) Foreign Application Priority Data
Jan. 23, 2015 (JP) .................................. 2015-011768

(51) Int. Cl.
*G06F 3/12* (2006.01)
*H04W 4/00* (2018.01)
*H04W 4/80* (2018.01)

(52) U.S. Cl.
CPC ............ *G06F 3/1292* (2013.01); *G06F 3/121* (2013.01); *G06F 3/1229* (2013.01); *G06F 3/1235* (2013.01); *G06F 3/1236* (2013.01); *H04W 4/80* (2018.02)

(58) Field of Classification Search
CPC ...... G06F 3/1235; G06F 3/1236; G06F 3/1292; H04L 67/16; H04L 67/34
See application file for complete search history.

(56) References Cited

U.S. PATENT DOCUMENTS

| | | | |
|---|---|---|---|
| 6,157,465 A | 12/2000 | Suda et al. | 358/407 |
| 6,334,161 B1 | 12/2001 | Suzuki et al. | 710/29 |
| 6,425,019 B1 | 7/2002 | Tateyama et al. | 710/11 |
| 6,477,570 B1 | 11/2002 | Takayama et al. | 709/224 |
| 6,559,962 B1 | 5/2003 | Fukunaga et al. | 358/1.15 |
| 6,603,737 B1 | 8/2003 | Fukunaga et al. | 370/229 |
| 6,717,694 B1 | 4/2004 | Fukunaga et al. | 358/1.16 |
| 6,775,020 B2 | 8/2004 | Fukunaga et al. | 358/1.15 |
| 6,874,082 B2 | 3/2005 | Tateyama et al. | 713/1 |
| 7,062,579 B2 | 6/2006 | Tateyama et al. | 710/104 |

(Continued)

*Primary Examiner* — Peter K Huntsinger
(74) *Attorney, Agent, or Firm* — Fitzpatrick, Cella, Harper & Scinto

(57) ABSTRACT

An event generated in a communication apparatus is sensed. Whether a communication partner apparatus exists in the effective range of a communication unit is detected in accordance with the sensed event. When it is detected that the communication partner apparatus exists in the effective range of the communication unit, application information about an application that operates in the communication partner apparatus is obtained. Activation information including identification information indicating an application to be activated in the communication partner apparatus, and execution information to be executed by the application is transmitted to the communication partner apparatus via the communication unit, based on the obtained application information.

14 Claims, 10 Drawing Sheets

(56) References Cited

U.S. PATENT DOCUMENTS

| | | | |
|---|---|---|---|
| 7,401,213 B2 | 7/2008 | Tateyama et al. | 713/1 |
| 7,430,660 B2 | 9/2008 | Fukunaga et al. | 713/2 |
| 7,586,860 B2 | 9/2009 | Shitano et al. | 370/282 |
| 7,631,181 B2 | 12/2009 | Hirata et al. | 713/151 |
| 7,720,477 B2 | 5/2010 | Moritomo et al. | 455/435.1 |
| 7,809,845 B2 | 10/2010 | Fujii | 709/230 |
| 7,882,196 B2 | 2/2011 | Fujii et al. | 709/208 |
| 7,882,234 B2 | 2/2011 | Watanabe et al. | 709/227 |
| 7,984,196 B2 | 7/2011 | Hirose et al. | 709/253 |
| 8,131,859 B2 | 3/2012 | Fujii et al. | 709/228 |
| 8,250,218 B2 | 8/2012 | Watanabe et al. | 709/227 |
| 8,503,933 B2 | 8/2013 | Moritomo et al. | 455/41.2 |
| 8,572,222 B2 | 10/2013 | Sakai et al. | 709/223 |
| 9,107,108 B2 | 8/2015 | Fujii | H04W 28/18 |
| 9,167,371 B2 | 10/2015 | Watanabe et al. | H04W 4/00 |
| 2007/0165265 A1* | 7/2007 | Ito | G06F 3/1207 358/1.15 |
| 2013/0301081 A1 | 11/2013 | Moritomo et al. | H04W 76/02 |
| 2013/0311666 A1 | 11/2013 | Fujii | H04L 69/24 |
| 2014/0023061 A1 | 1/2014 | Sakai et al. | H04W 76/021 |
| 2014/0297892 A1* | 10/2014 | Kaigawa | G06F 3/1204 710/5 |
| 2014/0319758 A1* | 10/2014 | Uohashi | B65H 1/14 271/162 |
| 2015/0365919 A1 | 12/2015 | Watanabe et al. | H04W 72/02 |

* cited by examiner

F I G. 6A
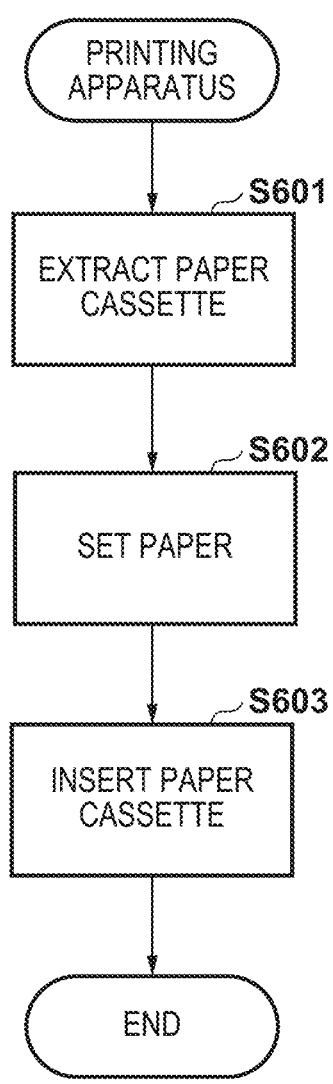
F I G. 6B
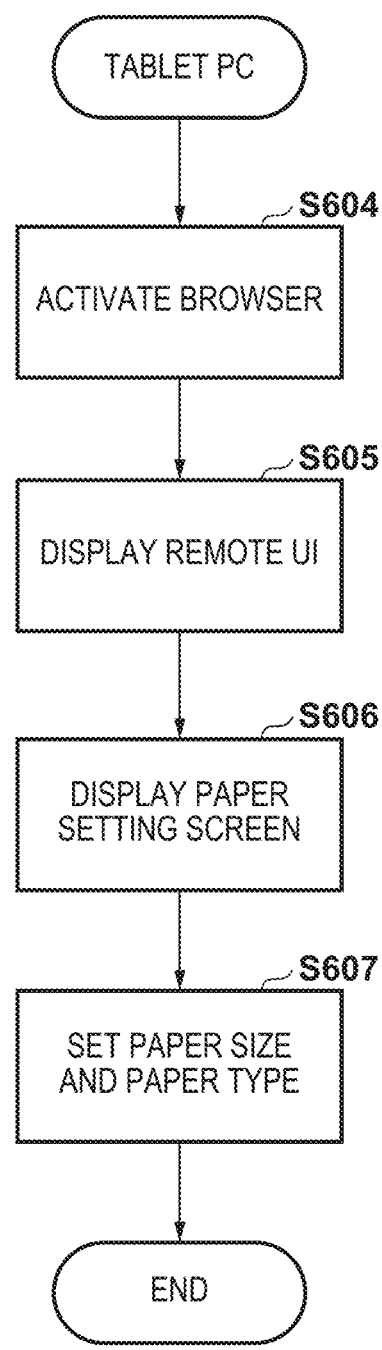

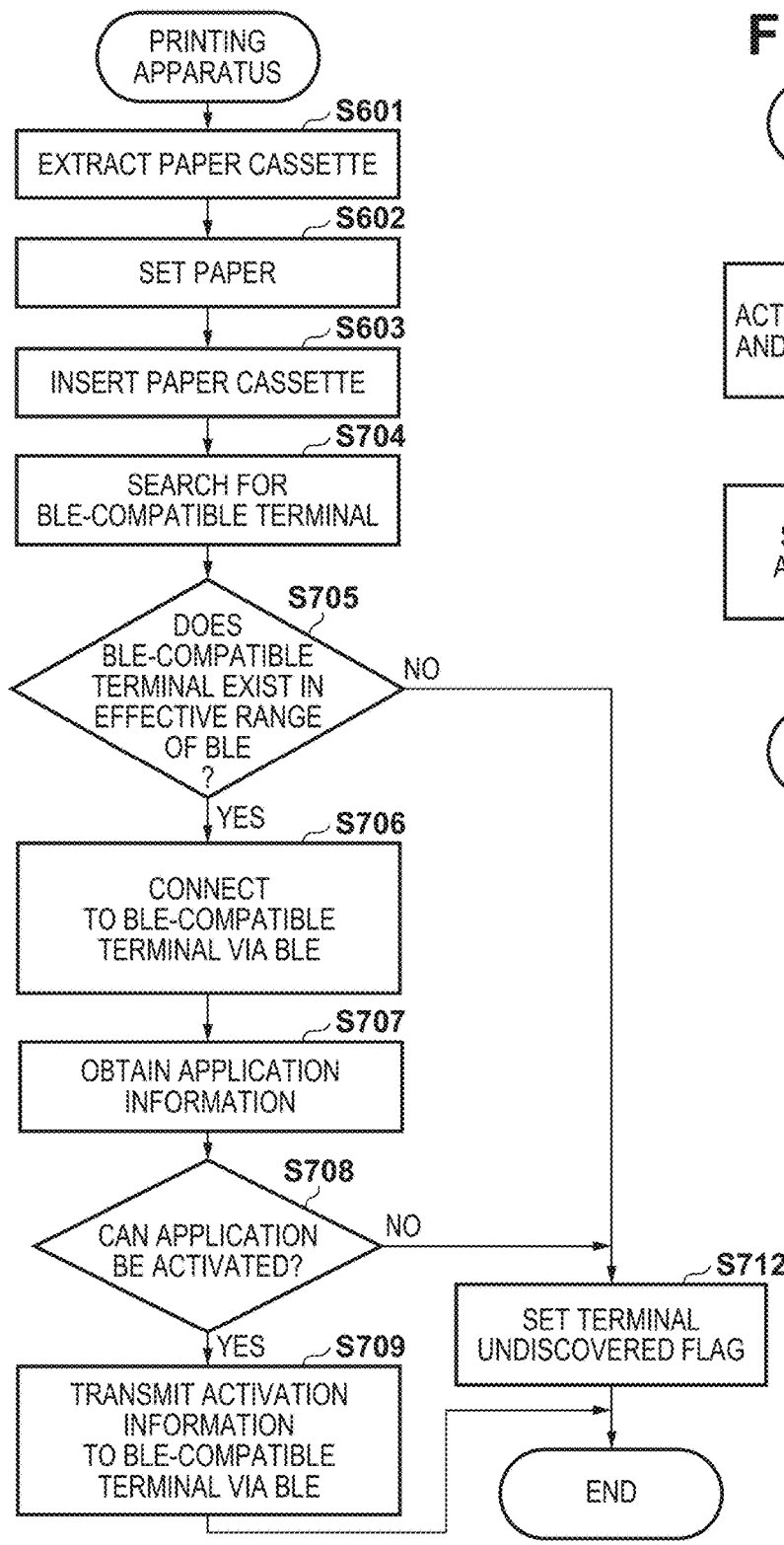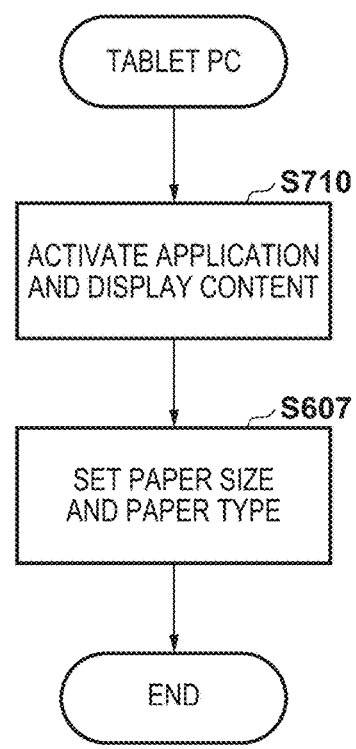

FIG. 8A

| APPLICATION ID [1] | CONTENT [1] | PRIORITY [1] |
|---|---|---|
| APPLICATION ID [2] | CONTENT [2] | PRIORITY [2] |
| APPLICATION ID [3] | CONTENT [3] | PRIORITY [3] |
| ⋮ | ⋮ | ⋮ |
| APPLICATION ID [n] | CONTENT [n] | PRIORITY [n] |

FIG. 8B

| "BROWSER" | "http://address/paper_set.html" | 10 |
|---|---|---|
| "BROWSER" | "http://address/ink_info.html" | 5 |

FIG. 8C

| "INITIAL SETTING APPLICATION" | "install_setting.txt" | 1 |
|---|---|---|

FIG. 8D

| "SCAN APPLICATION" |  | 3 |
|---|---|---|
| "PRINT APPLICATION" |  | 3 |

COMMUNICATION APPARATUS THAT OBTAINS APPLICATION INFORMATION FROM A COMMUNICATION PARTNER APPARATUS EXISTING WITHIN AN EFFECTIVE COMMUNICATION RANGE, CONTROL METHOD THEREFOR, AND STORAGE MEDIUM

BACKGROUND OF THE INVENTION

Field of the Invention

The present invention relates to a communication technique for communicating with a communication partner apparatus via a communication unit.

Description of the Related Art

Thanks to the popularization of smartphones and tablet PCs (Personal Computers), a case in which an external apparatus can be operated from a smartphone or tablet PC or information of an external apparatus can be browsed from a smartphone or tablet PC is growing. This also applies to a printing apparatus, and the operation of a job, setting of a printing apparatus, and a measure against an error can be performed from a smartphone or tablet PC.

For example, Japanese Patent Laid-Open No. 2005-531236 proposes an arrangement in which an information terminal transmits a wireless signal to a responder device and is connected to the responder device. The connected responder device transmits an application identifier and a content to the information terminal. The information terminal activates an application corresponding to the received application identifier, and transfers the content to the application.

However, in Japanese Patent Laid-Open No. 2005-531236, the responder device cannot notify the information terminal of an application identifier and content corresponding to an event or the situation of the responder device.

The present invention provides a communication technique capable of causing a communication partner apparatus to execute appropriate processing corresponding to an event generated in an apparatus.

SUMMARY OF THE INVENTION

According to one aspect of the present invention, there is provided a communication apparatus that communicates with a communication partner apparatus via a communication unit, comprising: a sensing unit configured to sense an event generated in the communication apparatus; a detection unit configured to detect, in accordance with the event sensed by the sensing unit, whether the communication partner apparatus exists in an effective range of the communication unit; an obtaining unit configured to, when the detection unit detects that the communication partner apparatus exists in the effective range of the communication unit, obtain application information about an application that operates in the communication partner apparatus; and a transmission unit configured to transmit, to the communication partner apparatus via the communication unit, activation information including identification information indicating an application to be activated in the communication partner apparatus, and execution information to be executed by the application, based on the application information obtained by the obtaining unit.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 6A and 6B are flowcharts showing operation procedures at the time of paper setting;

FIGS. 7A and 7B are flowcharts showing processing at the time of paper setting;

FIGS. 8A to 8D are views showing an example of application information;

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

In the embodiment, an information terminal to be described below is an information processing apparatus capable of operating a responder device. Various forms are conceivable for an information processing apparatus such as a smartphone or tablet PC, and an information device such as a Bluetooth® keyboard, the presence of which near a responder device is detected by the responder device. The embodiment will exemplify a case in which the information terminal is a tablet PC.

<First Embodiment>

Figure 1:
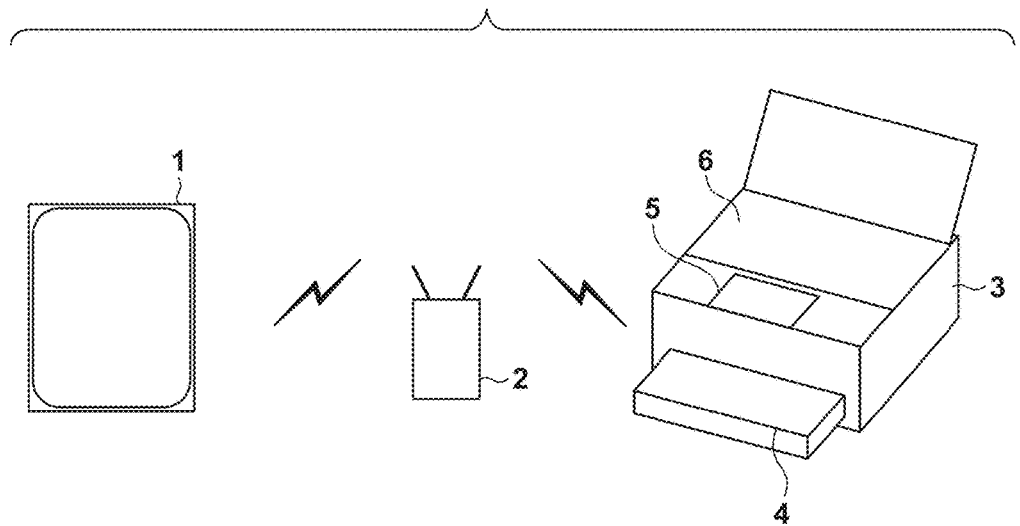
FIG. 1 is a view showing the schematic arrangement of an information processing system.

FIG. 1 is a view showing an example of the arrangement of an information processing system.

The information processing system in FIG. 1 shows a form in which a tablet PC 1 and a printing apparatus 3 are connected by a wireless LAN via an access point 2. Note that the connection form is not limited to this, and a connection form in which the tablet PC 1 and the printing apparatus 3 directly perform wireless communication is also possible.

The tablet PC 1 has a function of converting a document or image specified by a user into print data printable by the printing apparatus 3, and transferring the print data. The tablet PC 1 is connected to the access point 2 by the wireless LAN. The print data from the tablet PC 1 serving as a host with respect to the printing apparatus 3 can be transmitted to the printing apparatus 3 via the access point 2.

The printing apparatus 3 is also connected to the access point 2 by the wireless LAN. The printing apparatus 3 can receive print data from the tablet PC 1 via the access point 2. The printing apparatus 3 can transmit the state of the printing apparatus 3 to the tablet PC 1 via the access point 2. A main body display 5 of the printing apparatus 3 displays the state of the printing apparatus 3. By displaying a state such as the operation or error of the printing apparatus 3 on the main body display 5, the user can be notified of the contents. A paper cassette 4 of the printing apparatus 3 is a mechanism that stores printing media such as paper to be used when the printing apparatus 3 prints. When performing printing from the paper cassette 4, more than the number of paper sheets to be printed need to be set in the paper cassette 4.

When no paper is set in the paper cassette 4 and when the paper cassette 4 runs out of paper, the main body display 5 can display an out-of-paper error state to prompt the user to replenish the paper cassette 4 with paper. The printing apparatus 3 includes a mechanism (sensor) configured to sense insertion-extraction of the paper cassette 4, and can determine whether the paper cassette 4 has been inserted. By reading paper set on an image reader 6, a copy image or scan image can be obtained. The printing apparatus 3 includes a mechanism (sensor) configured to sense that an original has been set when the cover is closed. The printing apparatus 3 can determine whether paper has been set.

Figure 2:
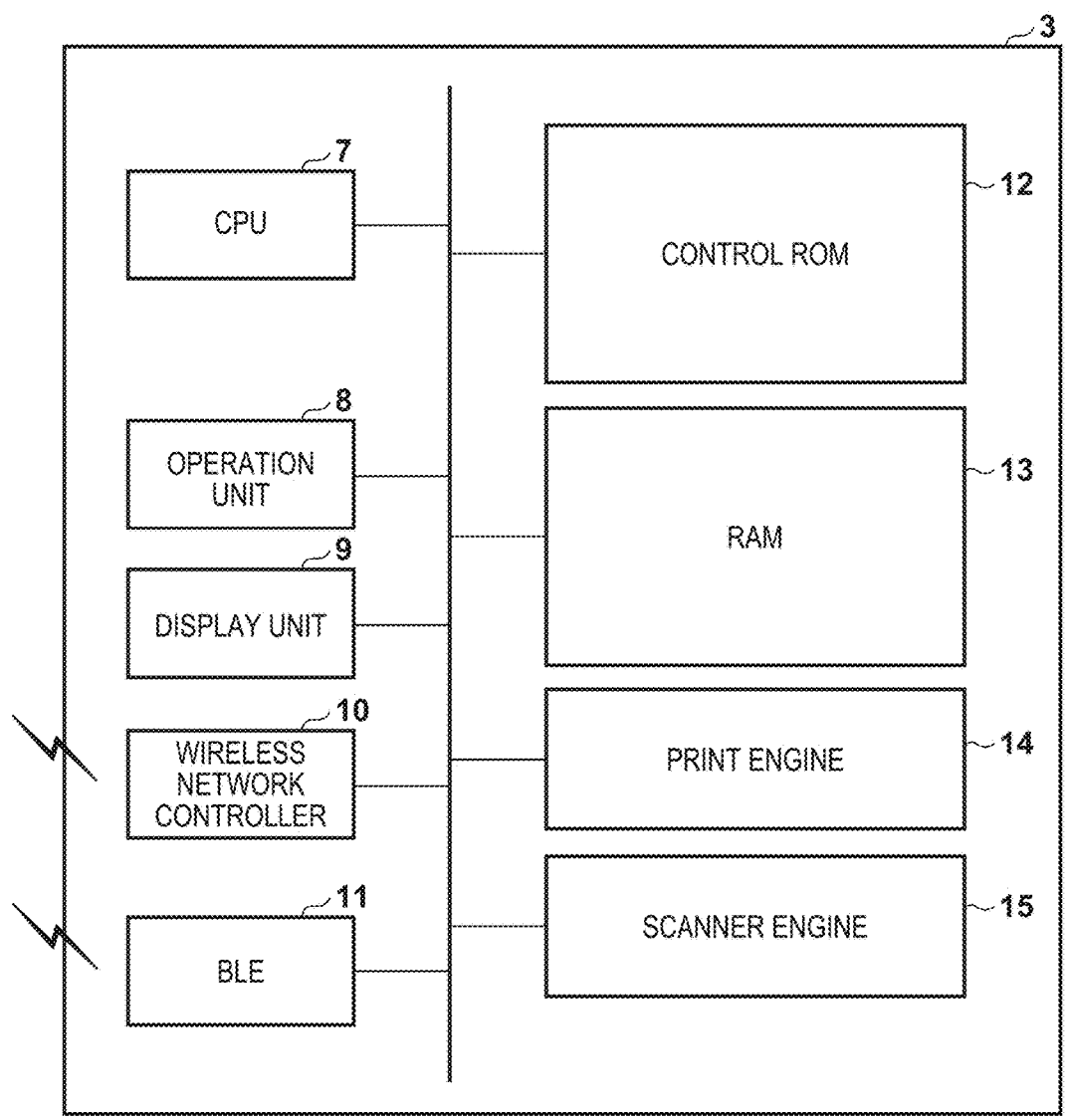
FIG. 2 is a block diagram showing the internal arrangement of a printing apparatus.

FIG. 2 is a block diagram showing the internal arrangement of the printing apparatus.

A CPU 7 controls the overall apparatus by executing various programs such as a basic control program stored in a control ROM 12 serving as a storage unit. A RAM 13 is a data holding area including a work area when executing a program read out from the control ROM 12. An operation unit 8 includes various input devices such as a key and button to be operated by the user. A display unit 9 is formed from a device such as a liquid crystal device, and displays various images such as an operation screen. The operation unit 8 and the display unit 9 implement the main body display in FIG. 1, and the main body display may be a touch panel.

A wireless network controller 10 controls transmission/reception of data such as a command for executing printing from the tablet PC 1 via the wireless LAN. The wireless network controller 10 transmits image data read by the image reader 6 to the tablet PC 1. The wireless network controller 10 is constituted by a communication module and antenna for performing wireless LAN communication. A BLE (Bluetooth® Low Energy) 11 is constituted by a communication module and wireless antenna for performing short distance wireless communication with the tablet PC 1.

A print engine 14 is a module for printing, and is constituted by a printing controller and a printing mechanism. As the printing mechanism, printing mechanisms of various methods such as an inkjet method and laser beam method are available. A scanner engine 15 is a module for performing image reading, and is constituted by a scanner controller and a scanner mechanism. The image reader 6 in FIG. 1 corresponds to the scanner engine 15.

Although FIG. 2 shows the wireless network controller 10 and the BLE 11 as communication functions, another communication function such as NFC can also be mounted additionally, or a communication function for wired communication can also be mounted.

The internal arrangement of the tablet PC 1 is the same as the arrangement of an information processing apparatus such as a general personal computer. When this arrangement is explained using the arrangement of the printing apparatus 3 in FIG. 2, the tablet PC 1 has an arrangement in which the print engine 14 and the scanner engine 15 in the arrangement shown in FIG. 2 are omitted. As in the printing apparatus 3, the tablet PC 1 can also execute various processes by reading out and executing programs stored in the control ROM 12 by the CPU 7. Programs stored in the control ROM 12 of the tablet PC 1 include programs for implementing a browser (to be described later) and various applications.

Figure 3:
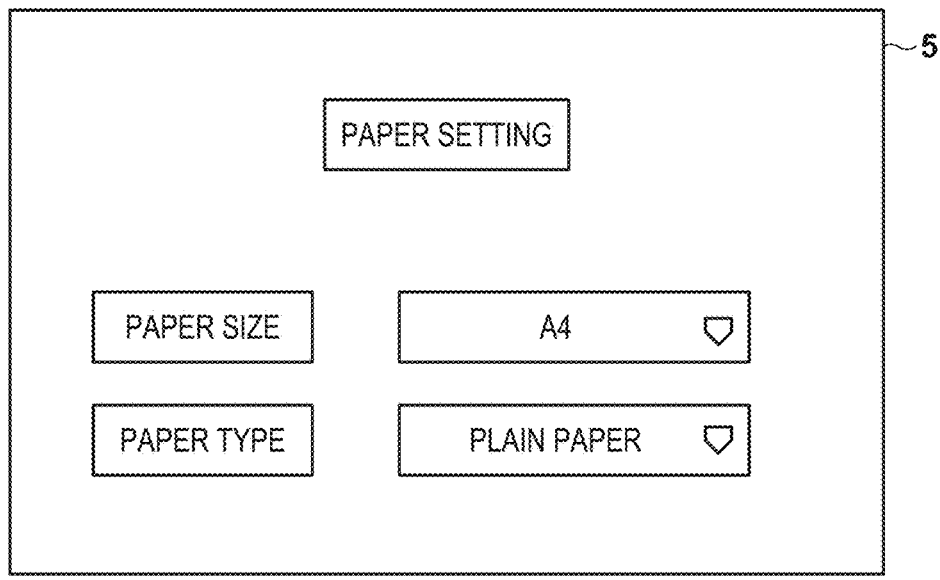
FIG. 3 is a view showing an operation screen displayed on a main body display at the time of paper setting.

FIG. 3 is a view showing an operation screen displayed on the main body display 5 at the time of paper setting.

For example, the user can extract the paper cassette 4 from the printing apparatus 3, replenish it with paper, and insert the paper cassette 4 into the printing apparatus 3. The printing apparatus 3 can display the operation screen shown in FIG. 3 on the main body display 5 to the user for paper setting. The user can specify the paper size (for example, A4 or A5) and paper type (for example, plain paper or glossy paper) of paper set in the paper cassette 4 via this operation screen.

The main body display 5 can display various kinds of information including the operation of the printing apparatus 3 such as "during job reception" or "during printing", and error information such as out of ink or out of paper, in addition to the operation screen for paper setting shown in FIG. 3, and various screens including a setting screen necessary for printing such as communication setting. The user can know the state of the printing apparatus 3 based on information displayed on the main body display 5.

Figure 4A:
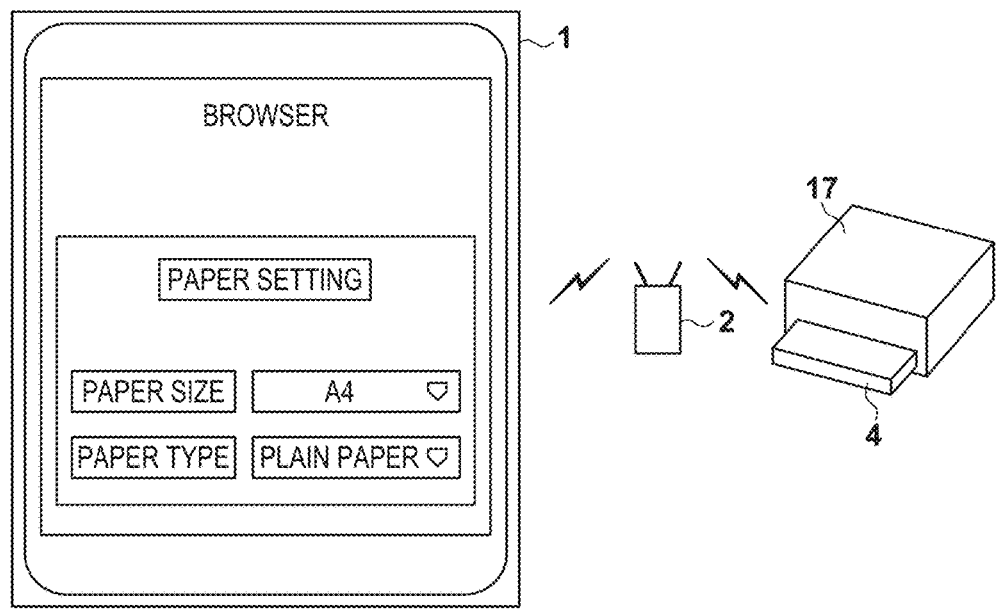
FIGS. 4A and 4B are views each showing a screen displayed on an information terminal.

However, the main body display 5 is not always mounted in the printing apparatus 3, and there is a printing apparatus in which the main body display 5 is not mounted. FIG. 4A shows a printing apparatus 17 in which no main body display is mounted, and shows a form in which the tablet PC 1 is connected to the printing apparatus 17 via the access point 2. Note that the internal arrangement of the printing apparatus 17 is the same as the internal arrangement shown in FIG. 2 except for the absence of the operation unit 8 and display unit 9 equivalent to the main body display 5 in the internal arrangement of the printing apparatus 3 shown in FIG. 2.

In the case of the printing apparatus 17, an operation screen as shown in FIG. 3 cannot be displayed on the printing apparatus 17, so the operation screen is displayed on a browser operating in the tablet PC 1 at the time of paper setting. The user can perform paper setting from the tablet PC via this operation screen.

Figure 4B:
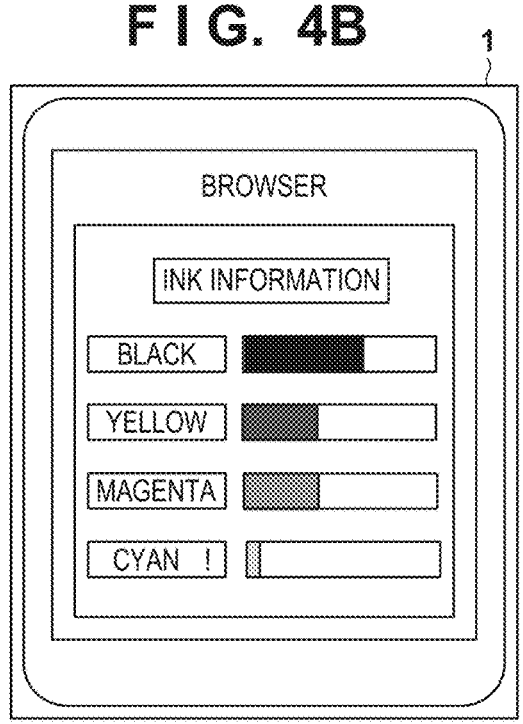

In this form, when ink runs out, a notification screen including this error information is displayed on the browser operating in the tablet PC 1, as shown in FIG. 4B. From this notification screen, the user can confirm information for solving an error (in this case, out of ink) generated in the printing apparatus 17.

As described above, in the case of the printing apparatus 17 in which no main body display is mounted, it becomes possible to make various settings of the printing apparatus 17 and confirm various kinds of information by using the browser operating in the tablet PC 1.

Figure 5A:
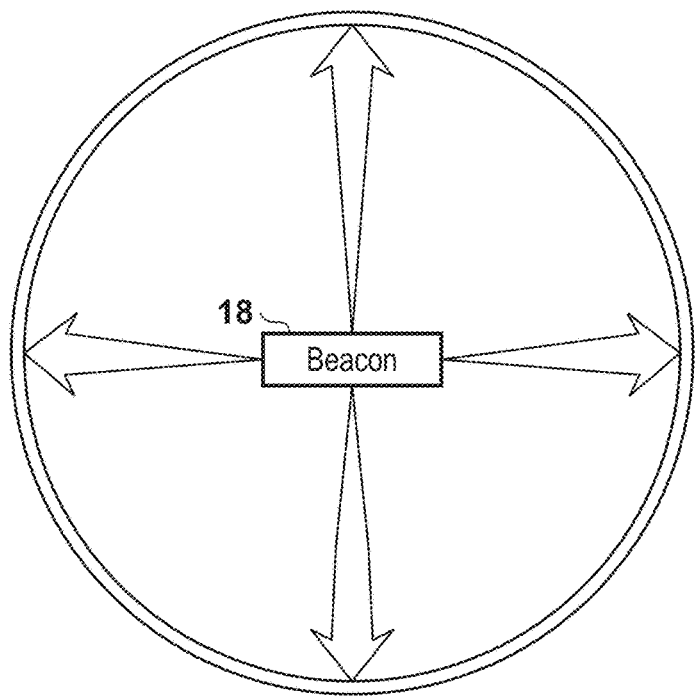
FIGS. 5A and 5B are views for explaining the effective range of a Beacon terminal.
Figure 5B:
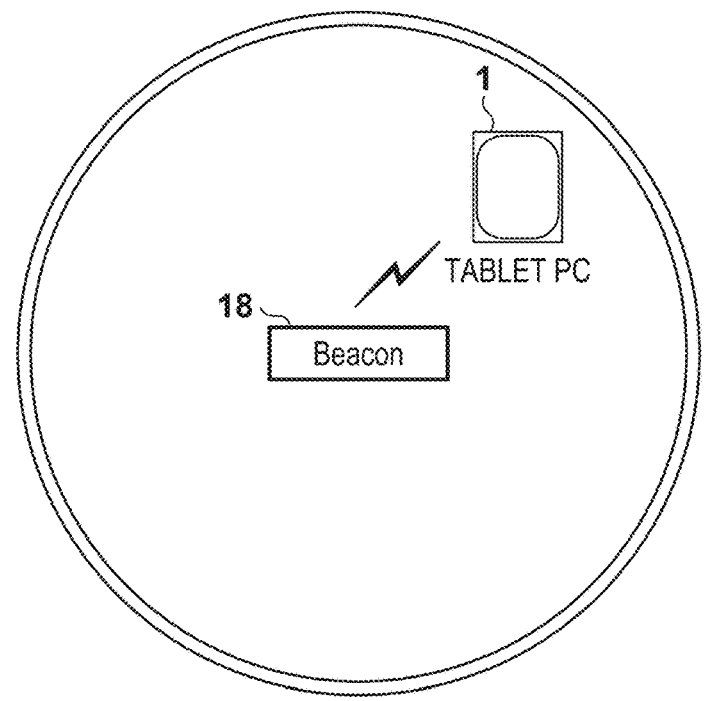

FIG. 5A shows the effective range of the BLE 11 in a Beacon terminal 18 in which the BLE 11 is mounted. The BLE 11 is one extended specification of Bluetooth®, which is a short distance wireless communication technique, and can communicate with very low power. The communication distance is a predetermined distance range (about 10 m). When a BLE-compatible terminal (for example, the tablet PC 1) capable of communicating with the BLE 11 exists in the effective range, as shown in FIG. 5B, the BLE 11 can be connected to the BLE-compatible terminal and communicate data in two ways though the capacity is small. In this manner, the Beacon terminal 18 can transmit application information and a content to the BLE-compatible terminal by using the BLE 11.

In this embodiment, an event represents, for example, an operation performed by the user with respect to the printing apparatus 3 such as setting paper in the paper cassette 4 of the printing apparatus 3 or setting paper on the image reader 6, or an error generated in the printing apparatus 3 such as out of ink or out of paper. In the following description, an event will be explained by exemplifying a case in which paper is set in the paper cassette 4.

First, general operation procedures when inserting the paper cassette 4 into the printing apparatus 17 and performing paper setting will be explained with reference to FIGS. 6A and 6B.

First, in step S601, the printing apparatus 17 senses that the paper cassette 4 has been extracted from the printing apparatus 17 in order to set paper. Then, in step S602, the printing apparatus 17 senses that paper to be used in printing has been set in the paper cassette 4. In step S603, the printing apparatus 17 senses that the paper cassette 4 has been inserted into the printing apparatus 17. In response to this, by using the mechanism (sensor) configured to sense that the paper cassette 4 has been inserted, the printing apparatus 3 detects the event in which the paper cassette 4 has been inserted.

In step S604 after executing up to the processing in step S603, the tablet PC 1 accepts a browser activation instruction from the user in order to perform paper setting. In step S605, the tablet PC 1 accepts input of identification information such as the IP address of the printing apparatus 3 on the activated browser, and displays a remote UI for performing setting on the printing apparatus 17. The tablet PC 1 displays a paper setting screen (for example, FIG. 4A) on the browser in step S606, and the paper size and paper type are set (changed) via the paper setting screen in step S607.

The above-described processing is a series of operation procedures at the time of paper setting. When displaying a remote UI, the user needs to confirm identification information such as an IP address for specifying the printing apparatus 3, and needs to directly input access information such as a URL to the browser.

This embodiment implements an arrangement for more efficiently executing these operation procedures and accompanying processing. Processing to be executed between the tablet PC 1 and the printing apparatus 17, including operation procedures at the time of paper setting in this embodiment will be explained with reference to the flowcharts of FIGS. 7A and 7B. Particularly in the processing shown in FIGS. 7A and 7B, the printing apparatus 17 searches for the tablet PC 1 in which the browser can be activated using the BLE 11, in correspondence with an event in which the paper cassette 4 has been inserted into the printing apparatus 17. The detected tablet PC 1 automatically displays the paper setting screen without an operation by the user.

In FIGS. 7A and 7B, the same step numbers as those in FIGS. 6A and 6B denote common operations, and a description thereof will not be repeated. Processes to be executed by the printing apparatus 17 and the tablet PC 1 are implemented by reading out and executing programs stored in the control ROMs 12 by the CPUs 7 of the printing apparatus 17 and tablet PC 1.

Steps S601 to S603 are the same as those in FIG. 6A, and a description thereof will not be repeated. By using the mechanism (sensor) configured to sense that the paper cassette 4 has been inserted, the printing apparatus 17 senses an event in which the paper cassette 4 has been inserted.

In response to this sensing, the printing apparatus 17 searches for a BLE-compatible terminal (for example, the tablet PC 1 in which the browser can be activated using the BLE 11) in step S704. In step S705, the printing apparatus 17 determines whether the BLE-compatible terminal to be searched exists in the effective range of the BLE 11. If the printing apparatus 17 determines that the BLE-compatible terminal exists in the effective range (YES in step S705), the printing apparatus 17 is connected to the BLE-compatible terminal (in this case, the tablet PC 1) via the BLE 11 in step S706. When a plurality of BLE-compatible terminals are detected, it is also possible to select one of them in accordance with a predetermined criterion (for example, a BLE-compatible terminal having a maximum received signal strength), and connect the printing apparatus 17 to the selected BLE-compatible terminal. Alternatively, the printing apparatus 17 may be connected to all the detected BLE-compatible terminals in turn every time subsequent processing is completed.

After the connection is established, the printing apparatus 17 obtains, from the tablet PC, information of an application that can be activated in the tablet PC 1, in step S707. The application information is constituted by information about an application such as the type of an application to be executed in the connected BLE-compatible terminal, and a processable file. Details of the application information will be described below with reference to FIGS. 8A to 8D.

In step S708, the printing apparatus 17 determines, based on the obtained application information, whether the tablet PC 1 can activate the application (for example, the browser for displaying the paper setting screen). If the tablet PC 1 can activate the application (browser) (YES in step S708), the printing apparatus 17 transmits activation information to the tablet PC 1 via the BLE 11 in step S709. Note that the activation information includes an application ID indicating an activation target application (browser), and argument information to be used at the time of executing the application. The argument information is, for example, a content (paper setting screen or its access information (for example, URL)).

In step S710, the tablet PC 1 activates the activation target application (browser) based on the activation information received from the printing apparatus 17 (activation information transmitted in step S709), and displays a content (paper setting screen (for example, FIG. 4A)) in accordance with the argument at the time of execution.

In step S607, the tablet PC 1 can set a paper size and paper type input via the displayed paper setting screen. Upon completion of setting the paper size and paper type via the paper setting screen, setting information representing the setting contents is transmitted from the tablet PC 1 to the printing apparatus 17, and stored and set in the printing apparatus 17.

If the printing apparatus 17 determines that no BLE-compatible terminal exists in the effective range (NO in step S705), or determines that the tablet PC 1 cannot activate the application (browser) (NO in step S708), the printing apparatus 17 sets a terminal undiscovered flag indicative of this. Note that the set terminal undiscovered flag is stored in, for example, the RAM 13.

FIGS. 8A to 8D show an example of application information obtained from the BLE-compatible terminal (tablet PC 1) by the printing apparatus 17 in step S707. The obtainment of the application information is implemented by, for example, sending a notification from the BLE-compatible terminal to the printing apparatus 3 in accordance with a request from the printing apparatus 17.

As shown in FIG. 8A, the application information includes various kinds of information. Application information, of which the printing apparatus 3 has been notified, includes an application ID for identifying an application executable by the BLE-compatible terminal, the content of an argument to be used at the time of execution, and a priority that determines a priority at the time of execution. The application ID is not limited to one that specifies a specific application to be actually executed, but may be a category representing the type of application such as "browser" or "mailer".

For example, when the application ID is "browser", as shown in FIG. 8B, the content includes, as an argument, a URL used in the browser.

When the tablet PC 1 notifies the printing apparatus 17 of the application information, the printing apparatus 17 can notify, in response to this, the tablet PC 1 of the activation information (application ID and argument (content information)) by the processing in FIG. 7A. For example, the tablet PC 1 can activate the browser of the application specified by the activation information and automatically display a corresponding content by using the URL indicated by the argument.

When the application information is "initial setting application" for displaying a manual used to perform an initial setting operation, as shown in FIG. 8C, it includes, as arguments, text data and image data for specifying an operation. In this case, the user can perform an operation in accordance with an operation instruction indicated by content information.

When the application ID is "scan application" or "print application", as shown in FIG. 8D, no content information is included. The "scan application" or "print application" can activate a corresponding application in the tablet PC 1 and perform the operation of the printing apparatus 3 through the application. In addition, when there are a plurality of events to be notified, the user can be notified of high-priority processing by referring to the priority.

Figure 9:
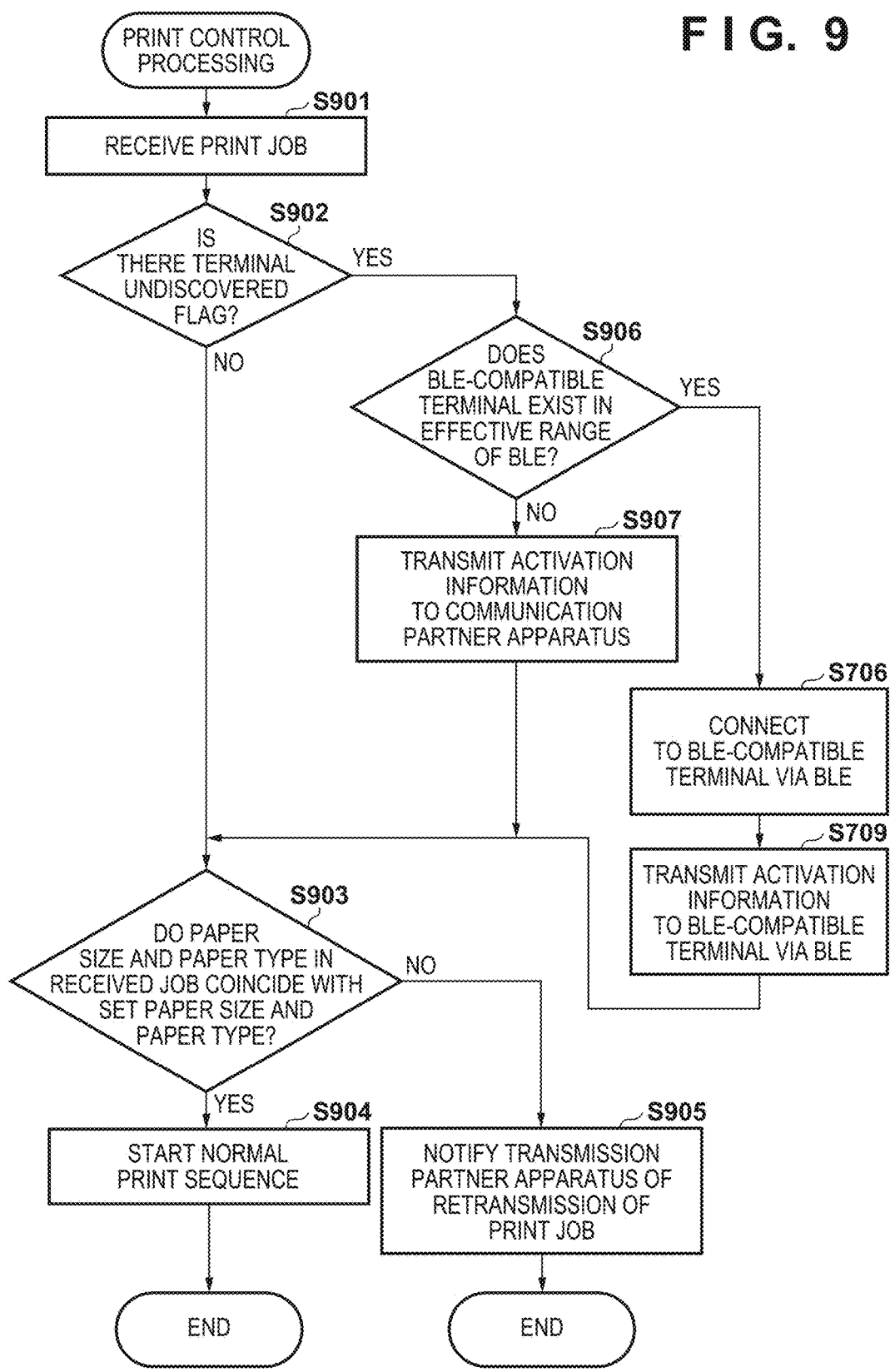
FIG. 9 is a flowchart showing print control processing.

Print control processing to be executed by the printing apparatus 17 upon receiving a print job from the tablet PC 1 in a state in which the terminal undiscovered flag is set in step S712 of FIG. 7A will be explained with reference to the flowchart of FIG. 9. Note that the processing in FIG. 9 is implemented by reading out and executing programs stored in the control ROM 12 by the CPU 7 of the printing apparatus 17. A paper size and paper type are assumed to have been set in the printing apparatus 17 from the tablet PC 1 via the paper setting screen at the start of this processing, as shown in FIGS. 7A and 7B. In the processing of FIG. 9, the same step numbers as those in FIGS. 7A and 7B denote common processes, and a detailed description thereof will not be repeated.

First, in step S901, the printing apparatus 17 receives a print job from a host terminal (in this case, the tablet PC 1). The transmission/reception of the print job is implemented by, for example, wireless communication via the wireless LAN by the wireless network controllers 10 of the printing apparatus 17 and tablet PC 1. In step S902, the printing apparatus 17 determines whether there is the terminal undiscovered flag. If there is no terminal undiscovered flag (NO in step S902), the printing apparatus 17 determines that there is no event to be notified. Further, in step S903, the printing apparatus 17 determines whether a paper size and paper type specified by the received job coincide with the set paper size and paper type.

If the paper sizes and paper types coincide with each other (YES in step S903), the printing apparatus 17 starts a normal print sequence in step S904. If the paper sizes and paper types do not coincide with each other (NO in step S903), the printing apparatus 17 notifies the transmission partner apparatus (tablet PC 1) that has transmitted the print job, of retransmission of the print job in step S905.

If there is the terminal undiscovered flag (YES in step S902), the printing apparatus 17 determines that there is an event to be notified, and determines in step S906 whether a notification destination BLE-compatible terminal (tablet PC 1) exists near the printing apparatus 3. That is, the printing apparatus 17 confirms whether the tablet PC 1 exists in the effective range of the BLE 11. If the tablet PC 1 does not exist in the effective range of the BLE 11 (NO in step S906), the printing apparatus 17 determines that the event notification destination is the transmission partner apparatus which has transmitted the print job. In step S907, the printing apparatus 17 transmits activation information based on application information that can be obtained from the transmission partner apparatus, in order to prompt the transmission partner apparatus to perform paper setting. Note that application information at this time is obtained from the transmission partner apparatus (tablet PC 1) via a communication unit (for example, the wireless network controller 10) used to receive the print job. Note that the transmission processing in step S907 is executed via the wireless LAN or the like.

Upon receiving the activation information, the tablet PC 1 can perform paper setting through steps S710 and S607 of FIG. 7B in accordance with the received activation information. In this case, the printing apparatus 17 cannot perform short distance wireless communication by the BLE 11, and thus transmits activation information corresponding to the event to the transmission partner apparatus by using not the BLE 11 but another communication function such as the wireless network controller 10.

If the tablet PC 1 exists in the effective range of the BLE 11 (YES in step S906), the printing apparatus 17 transmits activation information to the BLE-compatible terminal near the printing apparatus 17 and prompts it to perform paper setting by the processes in steps S706 and S709 of FIG. 7A. If a plurality of BLE-compatible terminals are detected in step S706 of FIG. 9 and one of them is a transmission partner apparatus that has transmitted a print job, the printing apparatus 17 may be connected to only this transmission partner apparatus. After paper setting is performed, even if the terminal undiscovered flag exists, the processes in step S903 and subsequent steps are executed.

As described above, according to the first embodiment, an operation (for example, activation of an application or display of the operation screen) corresponding to an event generated in the printing apparatus serving as a responder side device can be appropriately executed with respect to a communication partner. More specifically, an event generated in the printing apparatus can trigger the printing apparatus to notify an information terminal of activation information including corresponding application information (application ID) and execution information (argument or file), and activate a proper application in accordance with specific execution variable information. Although the processing target job is a print job, the processing in FIG. 9 can be executed even in a case in which an image reading job by the image reader 6 of the printing apparatus 17 is received.

<Second Embodiment>

The first embodiment has explained, as an event generated in the printing apparatus 17, an example of a case in which insertion of the paper cassette 4 into the apparatus is sensed. However, the event is not limited to this. For example, the processes in FIGS. 7A and 7B may be executed for an event "out of consumables" such as out of ink or out of paper, as described above. For example, when ink runs out, a printing apparatus 17 notifies a tablet PC 1 of the type of ink that has run out, and activation information corresponding to a notification screen (for example, FIG. 4B) that prompts ink replenishment. In accordance with the information notified by the printing apparatus 17, the tablet PC 1 can automatically display, on a browser, information that prompts ink replenishment.

The processes in FIGS. 7A and 7B may be executed in response to, as still another event, an event in which the user has set paper in an image reader 6 of the printing apparatus 17. The image reader 6 includes a mechanism (sensor) configured to sense setting of paper, and when the cover is closed, can sense that paper has been set. When setting of paper is sensed, the printing apparatus 17 notifies the tablet PC 1 of activation information including a content (scan operation screen) and an application ID indicating a scan application for reading an image. Hence, the scan operation screen can be displayed to the user without requiring an operation by him.

Although content information is not specified in the application information shown in FIG. 8D, the content of which the user is notified is arbitrary as long as the content guides the user to an operation, such as a user manual, image, or moving image.

As described above, according to the second embodiment, as in the first embodiment, a setting screen and notification screen corresponding to a generated event can be displayed on the browser of the tablet PC 1 from the printing apparatus 17.

<Third Embodiment>

Figure 10:
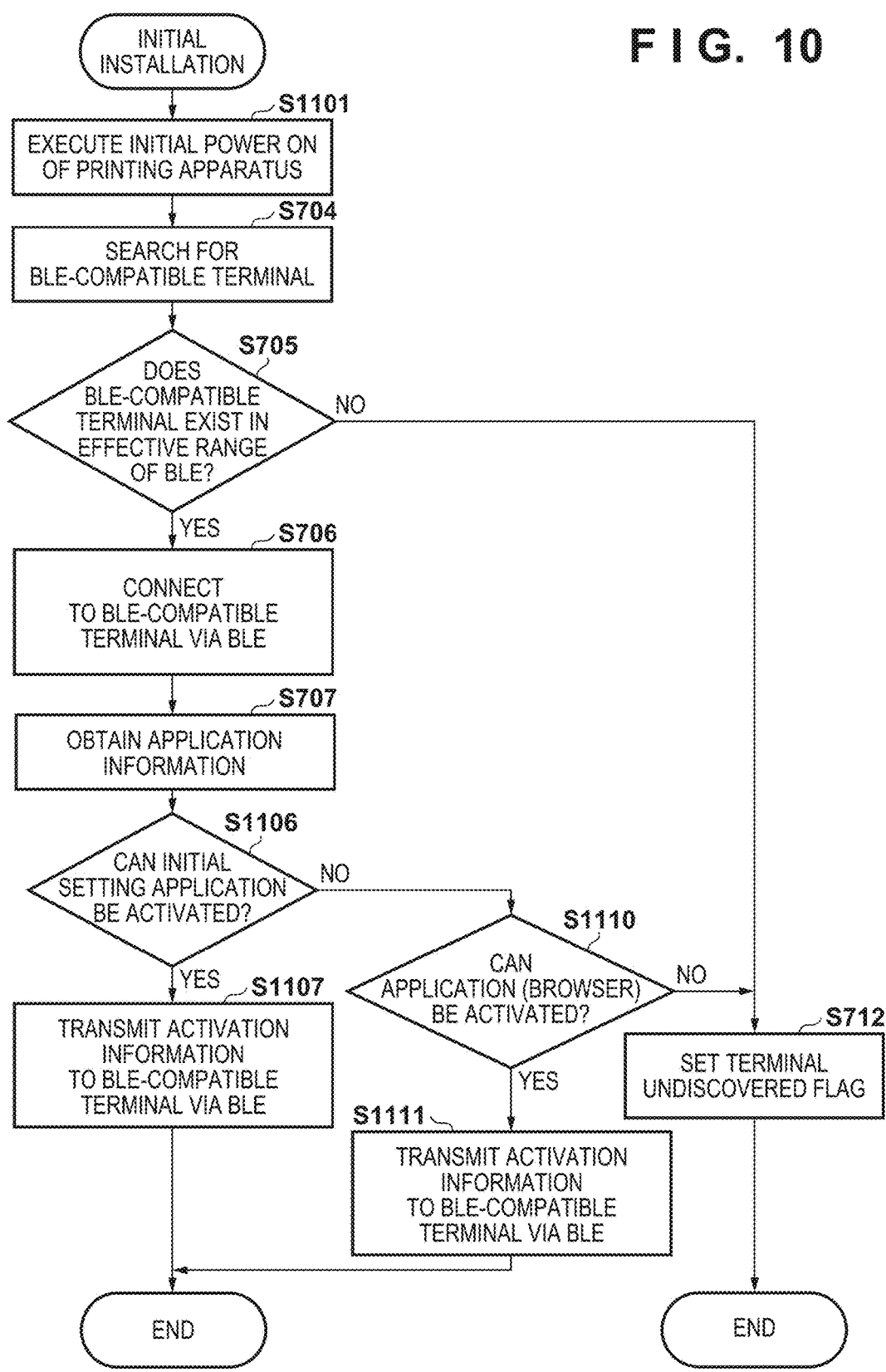
FIG. 10 is a flowchart showing processing at the time of initial installation.

The third embodiment will exemplify initial installation as an event generated in a printing apparatus 17. The event that may be generated in initial installation is initial power ON of the printing apparatus 17. Processing at this time will be explained with reference to FIG. 10 showing processing complying with the processing shown in the flowchart of FIG. 7A according to the first embodiment. By the processing in FIG. 10, the printing apparatus 17 can notify a user near the printing apparatus 17 of an operation method at the time of initial installation without an operation by the user.

In FIG. 10, the same step numbers as those in FIG. 7A according to the first embodiment denote common operations, and a description thereof will not be repeated. Processes to be executed by the printing apparatus 17 and a tablet PC 1 are implemented by reading out and executing programs stored in control ROMs 12 by CPUs 7 of the printing apparatus 17 and tablet PC 1.

First, in step S1101, the printing apparatus 17 executes initial power ON in accordance with an operation from the user. After processes in steps S704 to S706, in step S1106, the printing apparatus 17 determines, based on obtained application information, whether a dedicated application (initial setting application) for setting at the time of initial installation can be activated. If the initial setting application can be activated (YES in step S1106), the printing apparatus 17 transmits the activation information to the tablet PC 1 via a BLE 11 in step S1107. Note that the activation information includes an application ID indicating an activation target initial setting application, and argument information to be used at the time of executing the application. The argument information is, for example, a content (initial setting information (for example, install setting.txt)).

Upon receiving the activation information in step S1107, the tablet PC 1 activates the activation target initial setting application based on the activation information received from the printing apparatus 17. Note that the activation information includes an application ID indicating the activation target initial setting application, and an argument (content) at the time of executing the application. The tablet PC 1 displays the content (initial setting information) in accordance with the argument at the time of execution.

If the initial setting application cannot be activated (NO in step S1106), the printing apparatus 17 determines, based on obtained application information, whether the tablet PC 1 can activate an alternative application, in step S1110. Note that the alternative application is, for example, a browser for displaying initial setting information. If the tablet PC 1 can activate the application (browser) (YES in step S1110), the printing apparatus 17 transmits the activation information to the tablet PC 1 via the BLE 11 in step S1111. Note that the activation information includes an application ID indicating an activation target application (browser), and argument information to be used at the time of executing the application. The argument information is, for example, a content (initial setting information (for example, install_setting.txt)).

Upon receiving the activation information in step S1111, the tablet PC 1 activates the activation target application (browser) based on the activation information received from the printing apparatus 17. Note that the activation information includes an application ID indicating the activation target application (browser), and an argument (content) at the time of executing the application. The tablet PC 1 displays the content (initial setting information) in accordance with the argument at the time of execution.

As described above, according to the third embodiment, in addition to the effects described in the first embodiment, even if the tablet PC 1 does not cope with an initial setting application, another alternative application can notify the user of an initial setting coping method (initial setting information).

Although the content is a text file in the third embodiment, an application ID and content of which the user is notified are not limited to them. For example, the content is arbitrary as long as the content guides the user to an operation, such as a user manual, image, or moving image.

<Fourth Embodiment>

In the above-described embodiments, the tablet PC 1 and the printing apparatus 17 are configured so that the printing apparatus 17 induces/guides the tablet PC 1 to activate applications corresponding to various events, and guides an operation screen. However, the present invention is not limited to this. The configuration is arbitrary as long as processing is implemented between a plurality of communication apparatuses, and processing based on an event generated in one communication apparatus can be implemented by another communication apparatus.

It is also possible to apply the above-described embodiments between a tablet PC 1 and a printing apparatus 3 in place of a printing apparatus 17. It is also possible to apply the above-described embodiments as for processing between the tablet PC 1, and an image reading apparatus (image reading function) constituted by a single scanner, a facsimile apparatus, an image forming apparatus such as a copying apparatus, or a printing apparatus (printing function) as a single printer, instead of the printing apparatus 17. It is also possible to apply the above-described embodiments between the tablet PC 1 and a digital camera.

In the above-described embodiments, the application information shown in FIGS. 8A to 8D is held in the tablet PC 1 and if necessary, transmitted to the printing apparatus 17. However, the present invention is not limited to this. Application information held in each information terminal can also be stored and managed in the printing apparatus 17 for each information terminal, connection of which is assumed in the printing apparatus 17. Alternatively, application information can also be centralized in an external apparatus such as a dedicated server. Another information mobile terminal such as a smartphone can also be used instead of the tablet PC 1. Steps S706, S709, S1107, and S1111 may be executed by another communication method, instead of communication via Bluetooth. For example, NFC may be used instead of Bluetooth.

The above-described embodiments produce effects particularly when the user of an information terminal who is assumed to operate the printing apparatus 17 exists at a position (in a predetermined distance range) relatively close to the printing apparatus 17. That is, a state in which the user of the information terminal exists at a position close to the printing apparatus 17 is a state in which the user is to use the printing apparatus 17 or is using it. To sense a user in this state, it is effective to use a communication unit having a short distance wireless communication function of a relatively small effective communication range. This is because, if the effective communication range is excessively large, even the user of an unnecessary information terminal who is not assumed to operate the printing apparatus 17 may be sensed. From this viewpoint, it is effective to sense an information terminal by using the BLE, as in the above-described embodiments.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-011768, filed Jan. 23, 2015 which is hereby incorporated by reference herein in its entirety.

What is claimed is:

1. A communication apparatus that communicates with a communication partner apparatus via a communication unit, comprising:
at least one memory that stores instructions; and
at least one processor that, upon execution of the stored instructions, performs functions of:
a sensing unit configured to sense an event generated in the communication apparatus;
a detection unit configured to detect, in response to the event being sensed by the sensing unit, whether the communication partner apparatus exists in an effective range of the communication unit;
a selection unit configured to, when the detection unit detects that the communication partner apparatus exists in the effective range of the communication unit, select an application corresponding to the sensed event without accepting any application selection instruction from a user, wherein (1) a first application is selected in a case where a first event is sensed, and (2) a second application different from the first application is selected in a case where a second event different from the first event is sensed;
a receiving unit configured to receive, via another communication unit that has another effective range different from the effective range of the communication unit of the communication apparatus, a job that is to be executed by the communication apparatus; and
a transmission unit configured to transmit, to the communication partner apparatus via the other communication unit, an activation instruction for the selected application in a case where the job is received via the other communication unit and where it is detected that the communication partner apparatus does not exist in the effective range of the communication unit, and to transmit, to the communication partner apparatus via the communication unit, an activation instruction for the selected application in a case where the job is received via the other communication unit and where it is detected that the communication partner apparatus exists in the effective range of the communication unit,
wherein the activation instruction for an application for setting paper information is transmitted in a case where insertion-extraction of a cassette that stores paper to be printed by a printing function of the communication apparatus is sensed as the event, and
wherein the paper information that is designated by the application for setting paper information is registered in the communication apparatus.

2. The apparatus according to claim 1, wherein the at least one processor further performs a function of a determination unit configured to determine, based on application information obtained from the communication partner apparatus, whether the communication partner apparatus can activate the selected application,
wherein the transmission unit transmits, to the communication partner apparatus via the communication unit, the activation instruction in a case where it is determined that the communication partner apparatus can activate the selected application.

3. The apparatus according to claim 1, wherein the sensing unit senses at least one of:
insertion-extraction of a cassette that stores paper to be printed by a printing function of the communication apparatus;
out of consumables to be used by the printing function; and setting of paper to be read by an image reading function of the communication apparatus.

4. The apparatus according to claim 1, wherein the at least one processor further performs a function of a storage unit configured to, when the detection unit detects that the communication partner apparatus does not exist in the effective range of the communication unit, store information representing that the communication partner apparatus does not exist in the effective range of the communication unit.

5. The apparatus according to claim 1, wherein the effective range of the communication unit is an effective range of Bluetooth Low Energy.

6. The apparatus according to claim 1, wherein the obtaining unit obtains the application information from a storage unit of the communication apparatus that stores the application information in advance.

7. A method for controlling a communication apparatus that communicates with a communication partner apparatus via a communication unit, comprising:
sensing an event generated in the communication apparatus;
detecting, in response to the event being sensed by the communication apparatus, whether the communication partner apparatus exists in an effective range of the communication unit;
when the communication partner apparatus is detected to exist in the effective range of the communication unit, selecting an application corresponding to the sensed event without accepting an application selection instruction from a user, wherein (1) a first application is selected in a case where a first event is sensed and (2) a second application different from the first application is selected in a case where a second event different from the first event is sensed;
receiving, via another communication unit that has another effective range different from the effective range of the communication unit of the communication apparatus, a job that is to be executed by the communication apparatus;
transmitting, to the communication partner apparatus via the other communication unit, an activation instruction for the selected application in a case where the job is received via the other communication unit and where it is detected that the communication partner apparatus does not exist in the effective range of the communication unit; and
transmitting, to the communication partner apparatus via the communication unit, an activation instruction for the selected application in a case where the job is received via the other communication unit and where it is detected that the communication partner apparatus exists in the effective range of the communication unit,
wherein the activation instruction for an application for setting paper information is transmitted in a case where insertion-extraction of a cassette that stores paper to be printed by a printing function of the communication apparatus is sensed as the event, and
wherein the paper information that is designated by the application for setting paper information is registered in the communication apparatus.

8. The method according to claim 7, further comprising determining, based on application information obtained from the communication partner apparatus, whether the communication partner apparatus can activate the selected application,
wherein the activation instruction is transmitted to the communication partner apparatus via the communication unit in a case where it is determined that the communication partner apparatus can activate the selected application.

9. The method according to claim 7, wherein at least one of the following events is sensed:
insertion-extraction of a cassette that stores paper to be printed by a printing function of the communication apparatus;
out of consumables to be used by the printing function; and
setting of paper to be read by an image reading function of the communication apparatus.

10. The method according to claim 7, further comprising storing, when it is detected that the communication partner apparatus does not exist in the effective range of the communication unit, information representing that the communication partner apparatus does not exist in the effective range of the communication unit.

11. The method according to claim 7, wherein the effective range of the communication unit is an effective range of Bluetooth Low Energy.

12. The method according to claim 7, wherein the communication apparatus is a printing apparatus without a display.

13. The method according to claim 7, wherein a browser is activated on the communication partner apparatus, and contents based on a URL included in the activation information is displayed on the browser.

14. A non-transitory computer-readable storage medium storing a computer program for causing a computer of a communication apparatus that communicates with a communication partner apparatus via a communication unit, to
sense an event generated in the communication apparatus;
detect, in response to the event being sensed by the communication apparatus, whether the communication partner apparatus exists in an effective range of the communication unit;
when the communication partner apparatus is detected to exist in the effective range of the communication unit, select an application corresponding to the sensed event without accepting an application selection instruction from a user, wherein (1) a first application is selected in a case where a first event is sensed and (2) a second application different from the first application is selected in a case where a second event different from the first event is sensed;
receive, via another communication unit that has another effective range different from the effective range of the communication unit of the communication unit of the communication apparatus, a job that is to be executed by the communication apparatus;
transmit, to the communication partner apparatus via the other communication unit, an activation instruction for the selected application in a case where the job is received via the other communication unit and where it is detected that the communication partner apparatus does not exist in the effective range of the communication unit; and
transmit, to the communication partner apparatus via the communication unit, an activation instruction for the selected application in a case where the job is received via the other communication unit and where it is detected that the communication partner apparatus exists in the effective range of the communication unit,
wherein the activation instruction for an application for setting paper information is transmitted in a case where insertion-extraction of a cassette that stores paper to be printed by a printing function of the communication apparatus is sensed as the event, and wherein the paper information that is designated by the application for setting paper information is registered in the communication apparatus.

* * * * *